United States Patent Office 2,767,083
Patented Oct. 16, 1956

2,767,083

USE OF NUCLEATING AGENTS IN THE REDUCTION OF SALTS TO METAL

Vladimir Nicolaus Mackiw, Fort Saskatchewan, Alberta, and Wei Cheng Lin, Ottawa, Ontario, Canada, Tuhin Kumar Roy, Calcutta, West Bengal, India, and Vasyl Kunda, Fort Saskatchewan, Alberta, Canada, assignors to Chemical Construction Corporation, New York, N. Y., a corporation of Delaware No Drawing. Application December 23, 1953,
Serial No. 400,117

10 Claims. (Cl. 75—108)

This invention is concerned with the precipitation of non-ferrous metals from aqueous solutions of dissolved metal salts by the action of reducing gases at elevated temperature and pressure. More particularly, it relates to an improvement in such processes to obtain copper, cobalt and nickel as metal powder of more desirable physical and chemical characteristics such as size, density or purity. Still more particularly, it deals with the use of nucleation promoters, which at reduction conditions are reducing agents, to initiate precipitation from such solution of metal powder having characteristics which render it suitable for use as nuclei in treating additional portions of solution.

In recent years, there has been a continually increasing commercial interest in the hydrometallurgical recovery of non-ferrous metals, particularly nickel and cobalt, from various ores, ore concentrates, plant by-products and secondary metals. Various proposals have been made, not only in leaching methods, but also in methods of separately or conjointly precipitating metal powders from solution and in overall processes combining these features. It is with the reduction or precipitation of metals from solutions with which this present invention is concerned.

It should be understood that the treatment of solutions at elevated temperatures and pressures with a suitable reducing gas to reduce or precipitate metal therefrom is usually referred to as reduction. However, in accordance with this invention, there are certain stages in this reduction treatment at which different results, for example different product characteristics such as size or density, are sought and obtained. These stages may not be all conducted under similar operating conditions.

In order to minimize the possibility of confusion, it is desirable to define certain terms which will be used in the subsequent discussion. Throughout the specification and claims, therefore, the following terms will have the following meanings:

Nuclei: fine metal particles precipitated and/or grown from solution in the substantial absence of added metal powder.

Seed: fine metal particles, including preformed nuclei, usually but not necessarily of the metal to be recovered, which are present in the slurry which is being treated and which provide surfaces on which precipitated metal may deposit, even under conditions at which nuclei do not form readily.

Reduction: the generic designation of the overall operation in which elemental metal is obtained from a metal salt.

Nucleation: the initiation of reduction to and formation of nuclei.

Precipitation: that stage in reduction when metal is depositing on nuclei or on seed under conditions at which nuclei can form, usually resulting in particles of relatively low density.

Densification: reduction in the presence of seed powder under conditions at which nucleation is unlikely, whereby precipitated metal particles are obtained which have a greater apparent density than can be obtained under nucleation conditions.

In the past, it has been demonstrated that copper, nickel and cobalt can be precipitated, although with varying indifferent degrees of success, from both acidic and ammoniacal solutions. Such processes have not achieved commercial success because of failure in several respects. The degree to which reduction was obtained or the purity of the product, or both, were usually unsatisfactory. Either reduction could not be initiated or it could not be maintained. Even more troublesome, precipitation when obtained was seldom as useful discrete powder but more often as useless foil or plating on the vessel.

More recently it has been shown that reduction can be started and maintained by proper control of factors not previously recognized. In particular, it was found that deposition of the product metal as a useful, discrete powder during reduction could be obtained by careful control of the solutes content, both in initiating and in maintaining effective reduction. However, this degree of control is both troublesome and costly.

It has also been shown that the use of seed metal powder in such processes minimizes the necessity for the above described careful control and insures prompt initiation of densification reduction. Densification, however, provides little if any additional metal powder having suitable characteristics for use as seed powder in densification of additional portions of solutions. Accordingly, in order to obtain sufficient seed powder for further use, it has usually been necessary to mechanically size-reduce powder obtained by densification. Not only is this difficult because of the fine size desired, but it is an extremely costly procedure. Additionally, it is not wholly satisfactory because of the large recycle of metal powder necessitated.

More recently there has been suggested a process of providing nuclei suitable for use as seed metal powder by gas reduction and then using such nuclei in densification. In general, the process actually takes advantage of a difficulty which in the past has been quite troublesome. Solution conditions which are most suitable for initiating reduction, i. e., nucleation, to elemental metal are seldom, if ever, those most desirable for maintaining precipitation to the desired degree. One set of optimum conditions is required to obtain a self-nucleating solution. Under such conditions, precipitation may not be readily completed and the powder usually does not have the desired physical characteristics. Quite different conditions may be optimal for densification, i. e., completion of reduction and/or production of powder of optimum properties. Past attempts at compromise conditions were usually unsatisfactory, particularly for nickel and cobalt.

According to the above-noted suggestion, a process has been proposed in which seed powder of the proper type is precipitated from a solution which is adjusted for optimum self-nucleation, in other words a solution in which the reduction is most easily started. Seed metal so produced is then used to initiate densification in a solution which is adjusted for optimum conditions for desired grain growth.

While this process successfully avoids the disadvantages of mechanical reduction of metal powder to produce seed and provides nuclei suitable for use as seed for densification, nevertheless it, too, is subject to certain drawbacks. One major drawback is the extremely rigid control requirements. Nucleation occurs most satisfactorily under quite restrictive hydrogen ion content conditions, usually acidic. Similarly, densification usually best occurs under conditions in which the metal content is dissolved as a metal-ammine complex and the hydrogen ion content is much lower. Accordingly, extensive pH adjustments are usually required, particularly when the liquor to be nucleated has not been previously brought incidentally to a proper acid content suitable for nucleation. A further drawback is that even though excellent seed-powder is produced, the time required to obtain it is lengthy. The overall treatment time for complete precipitation from liquor under nucleating conditions may be quite long.

There remains, therefore, in the field of hydrometallurgy a demand which has not as yet been wholly satisfied. This demand is for a successful method for rapidly nucleating and then densifying the nuclei by precipitation of metal powder by gas reduction from solutions having widely diversified solutes contents. Particularly is such a method needed for treatment of ammoniacal metal-bearing solutions. It is a principal object of this invention, therefore, to fulfill this demand. It is a particular object of this invention to provide a method of rapidly inducing reduction and the precipitation of metal nuclei suitable for use as seed in densification reduction of the remainder of the nucleation solution and/or other portions of solution.

In general, this object has been surprisingly efficiently met by incorporating in the solution to be nucleated at least one of a group of materials which, under reduction conditions, acts as a nucleation promoter and is capable of rapidly initiating precipitation of metal as finely-divided particles suitable for use as seed in densification reduction of the nucleaton solution and/or other portions of solution.

Exactly why nucleation is induced in this startling manner by the presence of such materials is not understood at this point. Nor is it desired to limit this surprising discovery by any particular theory of operation. It appears, however, that these materials have some nucleation promoting ability which enhances the action of the reducing gas, usually hydrogen. It may be that these materials, themselves, under reducing conditions, are capable of inducing nucleation and precipitation of finely divided metal particles. Or perhaps these materials under reduction conditions form precipitates which are capable of inducing nucleation. Whatever the reason, the presence of any of such material is highly beneficial for the rapid initiation of precipitation of metal powder having nuclei characteristics.

The materials which have been found useful in accordance with the present invention vary quite widely in their chemical characteristics. Except for the fact that they are all capable of producing the desired result, it is rather difficult to classify them by common physical and/or chemical features.

While they may be either inorganic or organic compounds, the agents used according to this invention all appear to be reducing agents under the conditions of gaseous reduction. It is by this common function that they may be best classified. The nucleation promoters of this invention may be most descriptively defined as a class, therefore, as reducing agents.

Among the compounds falling within this definition are those comprising certain polyvalent metallic ions in their lowest state of oxidation. Included among these are compounds containing ferrous, stannous, cerous and manganous cations. These may readily be in the form of soluble salts. Gaseous reduction may be practiced on solutions of various different anions. The promoting cation, therefore, will preferably be added as the corresponding salt, i. e., for sulfate solutions, it will be added as sulfate.

Also included among the compounds found to have the desired nucleation promoting effect are various salts containing inorganic reducing anions. For example, soluble hypophosphites and hydrosulfides, used as soluble salts, sodium salts for instance, have been found highly satisfactory. Also soluble phosphite, cyanide, formate, thiosulfate, nitrite, sulfite and the like salts have been found to initiate reduction and formation of metal powder having nuclei characteristics.

Various organic compounds also may be employed. As examples, there might be mentioned hydrazine, hydroquinone, hydrazoic acid, formaldehyde, hydroxylamine and the like. Again these promoters may be used as salts with a compatible anion, such as the sulfate, for example.

It is apparent that there are many compounds which have the surprising quality of promoting nucleation. These, of course, do not all have this quality to the same extent. Some are superior to others. The amount employed in each case is to some extent governed accordingly. In general, at least about 0.01 g./l. is necessary to initiate nucleation. On the other hand, the amount should not be so great as to contaminate any densified metal powder product obtained by using as seed powder nuclei so formed. After nucleation is conducted to the desired extent, nuclei may be collected and/or combined with additional solution for densification reduction. The size of nuclei employed for densification reduction may vary. Excellent results are obtained, however, when nucleation reduction is continued sufficiently long to provide nuclei for densification reduction having an average particle diameter of at least about 1.0 micron.

In general, the specific nature or origin of the solution to be nucleated may be considered as independent of the present invention. From whatever source, an aqueous solution of soluble salts of the non-ferrous metals is obtained. Usually this solution will have been obtained by some known per se leaching operation of a suitable ore, ore concentrate, metallurgical plant by-product or secondary metals.

Actually the metals which may be treated according to the present invention may be any non-ferrous metal having an oxidation-reduction potential between those of cadmium and silver, inclusive, and which is capable of forming with ammonia a complex ion that is readily reduced to elemental metal with a suitable reducing gas. Practically, this contemplates the metals silver, mercury, copper, nickel, cobalt and cadmium. Commonly the metals principally encountered will be copper, cobalt and nickel. Copper, however, is more easily reduced under a wider range of conditions. Consequently, the need for a nucleating promoter is not so great. It is with the recovery of cobalt and nickel, therefore, that the present invention is particularly concerned.

The non-metallic ion which goes to make up the metal salt to be reduced may be of any inorganic acid or strong organic acid provided it forms a soluble salt of the metal and is not reduced under precipitation conditions. Generally these will be limited to the chlorides, acetates, sulfates, and carbonates. The nitrates are good under basic conditions but are not useful under acidic reduction conditions. In actual practice, only the sulfates and carbonates are commonly encountered. The invention has its greatest applicability in the treatment of copper, nickel and cobalt sulfates whether originally obtained by dissolving salts or by acid or ammoniacal leaching. Particularly when using ammoniacal leaching as a method of preparing the solution, it will be found that the solutions will contain varying amounts of ammonium sulfate or ammonium carbonate and it is contemplated that one or both of these materials may be and usually are present.

Depending upon solution conditions, the dissolved metal salt may be in any one of several forms. For example, in pregnant leach liquors the ammonium salt content may be quite high and the metal salt may be a simple salt such as the metal sulfate $MeSO_4$ or a complex metal ammine salt such as a metal ammine sulfate $Me(NH_3)_xSO_4$. The former is usually that found to some extent in solutions having an acidity greater than about pH 4–5. The latter may be found in solutions having varying hydrogen ion concentrations but appears in appreciable amounts at less than about pH 5.5 in the case of cobalt, or about pH 6.5 in the case of copper and nickel. The ammine salt will be found to comprise substantially the entire dissolved non-ferrous metal content when the acidity is less than a pH of about 7.5. Both forms may be found in the intermediate ranges. Between pH values of about 5–5.5 for cobalt, and 5–6.5 for copper and nickel, metal hydroxides and/or basic salts may be found when the ammonium sulfate content is low. In some cases, in solutions of near neutral or slightly acid characteristics, the dissolved metal may form a double salt such as a metal sulfate-ammonium sulfate double salt, probably of the structure $MeSO_4 \cdot (NH_4)_2SO_4 \cdot XH_2O$, as the solution is cooled. This will not be commonly encountered in leach liquors because, although the double salt is rather soluble as compared with the other forms, in the presence of a sufficient amount of ammonium salt it is practically insoluble. In solutions containing considerable excess free acid, particularly in the case of sulfates, some form of acid complex with the free acid appears to form. However, these sulfate complexes or their analogues are reducible under the conditions of the present invention.

A typical feed solution may be considered as an aqueous sulfuric acid or aqueous ammoniacal solution containing dissolved salts, illustratively sulfates, of nickel, cobalt and ammonia. Such a sulfate solution, if saturated and ammoniacal, may contain as high as 150 grams per liter of dissolved metal at ambient conditions. Acidic solutions usually run lower, about 100 grams per liter. In some cases these figures may be slightly higher, in others somewhat lower. A solution containing less than about 5–10 grams per liter is ordinarily uneconomical to treat commercially without first using some means of concentrating the solutes content. A typical solution found in practice will usually contain from about 30–70 grams per liter of combined nickel plus cobalt. For commonly encountered copper sulfate and copper carbonate solutions, the copper content will usually be less than 100 g./l. and 130 g./l., respectively.

Nucleation, precipitation and densification are carried out using a suitable, sulfur-free reducing gas such as carbon monoxide, hydrogen or a combination of them. In general, hydrogen, when it can be obtained, is preferable, especially for densification. Both nucleation and densification are carried out at a temperature above about 200° F., usually between about 250°–550° F. At least sufficient total pressure, including the reducing gas over pressure, should be used to prevent boiling of the solution at the reaction temperature. Pressures greatly in excess of this equivalent pressure are not necessary and do no particular good. They should be avoided as placing an unnecessary restriction on the apparatus requirements. For the same reason unnecessarily high temperatures should be avoided as requiring excessive pressures. It is a further advantage of this invention, moreover, that nucleation and precipitation may be carried out at lower temperatures.

The nucleation promoters of the present invention, particularly if a ferrous iron compound, may be contained in the solution received from earlier treatment steps. Usually, however, it will be added to the solution at the time the solutes content is being adjusted in preparation for nucleation.

The following examples will further demonstrate the method of this invention. These examples are meant only to be illustrative and not by way of limitation.

Examples 1–4 comprise runs in which no promoter was present during attempted nucleation. By comparison with subsequent examples, the advantages obtained by practicing the process of this invention are clearly demonstrated.

EXAMPLE 1

1500 parts of solution containing 50 gm./l. of cobalt as cobalt sulfate, 2.5 gm./l. of nickel as nickel sulfate and having an $NH_3$:Co ratio of 2:1, was treated with hydrogen at a temperature of 400° F. and a total pressure of 800 p. s. i. g. for 2 hours. Reduction was incomplete. No nuclei was formed. Substantially all of any metal precipitated occured as a tightly held incrustation on the walls of the reaction vessel.

EXAMPLE 2

Example 1 was repeated except that the $NH_3$:Co ratio was 3:1 and the treatment period was increased to 2.5 hours. Although the degree of reduction increased somewhat, substantially all metal precipitate still appeared as a tightly held wall incrustation.

EXAMPLE 3

Example 1 was repeated again, except that the solution was adjusted to an $(NH_4)_2SO_4$:Co ratio of 0.66:1 and reduction was conducted at 525° F. and 1000 p. s. i. g. for 1 hour. Even under these stringent conditions reduction was far from complete. Wall incrustation again occurred. Any metal appearing otherwise was not suitable for use as seen in subsequent densifications.

EXAMPLE 4

1500 parts of a solution containing 50 gm./l. of cobalt as cobalt chloride, an $NH_3$:Co ratio of 3:1 and an $(NH_4)_2SO_4$:Co ratio of 0.66:1 was treated with hydrogen at 400° F. and 800 p. s. i. g. total pressure. After 2 hours there was no appreciable precipitation in any form, much less as discrete powder suitable for use in densification.

EXAMPLES 5–9

The following reductions were conducted in the presence of 0.5 g./l., except 1.0 g./l. in Example 8, of sodium hypophosphite. Temperature was 400° F. and pressure 800 p. s. i. g. except in Example 5 which was 350° F. and 600 p. s. i. g. $NH_3$:metal and ammonium salt:metal ratios were 3:1 and 0.66:1 respectively except in Example 5 in which they were 2:1 and 1:1. Results are shown in Table I.

*Table I*

| Example | Co (g./l.) | Ni (g./l.) | Anion | Time (Min.) | Reduction, percent | Apparent Density (g./cc.) |
|---------|-----------|-----------|--------|-------------|--------------------|--------------------------|
| 5 | 0 | 25 | $SO_4^-$ | 30 | 98.7 | 1.0 |
| 6 | 50 | 2.5 | $SO_4^-$ | 70 | 99.0 | 1.68 |
| 7 | 0 | 25 | $Cl^-$ | 45 | 99.9 | 1.0 |
| 8 | 50 | 0 | $Cl^-$ | 120 | 99.7 | 1.0 |
| 9 | 35.2 | 0 | $CH_3COO$ | 120 | 98.2 | 1.0 |

Table I clearly illustrates the surprising results obtained when conducting nucleation in the presence of a small amount of sodium hypophosphite as a nucleation promoter. When treating sulfate and chloride solutions of nickel and cobalt as well as an acetate solution of cobalt, substantially complete precipitation of the dissolved metal content was obtained. In each example, moreover, precipitated metal was substantially 100% recovered as a fine powder suitable for use as seed in densification reductions.

EXAMPLE 10

2000 parts of a solution containing 50 g./l. of cobalt as cobalt sulfate, 2.5 g./l. of nickel as nickel sulfate, an $NH_3$:Co mol ratio of 3:1, an $(NH_4)_2SO_4$:Co mol ratio of 0.74 and as nucleation promoter 0.5 g./l. of $NO_2$ added as sodium nitrite is treated with hydrogen at 400° F. and a total pressure of 800 p. s. i. g. for two hours. Good reduction and recovery of fine seed powder is obtained.

EXAMPLE 11

2000 parts of a solution containing 50 g./l. nickel as nickel sulfate, an $NH_3$:Ni mol ratio of 3:1, an $(NH_4)_2SO_4$:Ni mol ratio of 1:1 and 0.5 g./l. $S_2O_4^=$ added as $Na_2S_2O_4$ was reduced with hydrogen at 350° F.

and 600 p. s. i. g. total pressure. After 2¾ hours reduction was 99.6% complete.

EXAMPLES 12 AND 13

Two samples of a solution containing 50 g./l. cobalt as cobalt sulfate, 2.5 g./l. nickel as nickel sulfate, an $NH_3$:Co mol ratio of 3:1 and an $(NH_4)_2SO_4$:Co ratio of 0.66 were reduced with hydrogen at 400° F. and 800 p. s. i. g. total pressure. The first sample was reduced in the presence of 0.5 g./l. of hydroquinone, the second in the presence of 0.5 g./l. of hydrazine sulfate. The results are shown in Table II.

Table II

| Example | Additive | Time (Min.) | Reduction, percent | Apparent Density (g./cc.) |
| --- | --- | --- | --- | --- |
| 12 | Hydroquinone | 75 | 99.4 | 0.82 |
| 13 | Hydrazine sulfate | 50 | 99.5 | 1.0 |

EXAMPLE 14

Example 3 was repeated except that reduction was conducted in the presence of 1.0 g./l. $Sn^{++}$ added as $SnSO_4$ and at 400° F. and 800 p. s. i. g. for 2 hours. 93.2% reduction was obtained substantially all as a fine powder highly suitable for use as seed powder in densification reduction.

EXAMPLE 15

A sample of solution containing 45 g./l. cobalt as cobalt sulfate, 2.5 g./l. nickel as nickel sulfate, an $NH_3$:Co mol ratio of 3:1, a $(NH_4)_2SO_4$:Co mol ratio of 0.70 and 1 g./l. $Mn^{++}$ added manganous sulfate was reduced with hydrogen at 400° F. and 800 p. s. i. g. for 90 minutes. Reduction was 99.5% complete, much of the metal being recovered in the form of fine powder suitable for use as seed powder in densification reduction.

EXAMPLE 16

Example 15 is repeated, replacing $Mn^{++}$ with 0.5 g./l. $Ce^{++}$ added as cerous sulfate and reducing for 2 hours at 450° F. and 900 p. s. i. g. Similar results are again obtained, reduction being 99.5% complete.

EXAMPLES 17-20

Four samples of a solution substantially free of iron, copper and cobalt containing 70 g./l. nickel as nickel sulfate and an $NH_3$:Ni mol ratio of 2:1 is heated to between about 250° F. and 500° F., preferably 350° F. and maintained at a hydrogen partial pressure within the range of about 100 to about 600 p. s. i., preferably about 400 p. s. i. Example 17 was free of added ferrous iron while Examples 18-20 contained the amounts indicated in Table III.

Table III

| Example | Fe++ (g./l.) | Nickel Start (g./l.) | Nickel Final (g./l.) | Time (min.) |
| --- | --- | --- | --- | --- |
| 17 | 0 | 70 | 0 | 400 |
| 18 | 4.5 | 70 | 0 | 20 |
| 19 | 2.0 | 70 | 0 | 28 |
| 20 | 1.0 | 70 | 0 | 45 |

In Example 17, substantially all precipitated nickel deposited as foil on the walls of the reaction vessel, only about 5% being recovered as metal powder. In Examples 18-20, substantially all precipitated metal was recovered as a light flocculent powder.

EXAMPLES 21-22

Examples 17-20 were repeated treating a solution containing 50 g./l. cobalt as cobalt sulfate at 400° F. and a hydrogen partial pressure of 400 p. s. i. Results are shown in Table IV.

Table IV

| Example | Fe++ (g./l.) | Cobalt Start, g./l. | Cobalt Finish, g./l. | Time (min.) |
| --- | --- | --- | --- | --- |
| 21 | 0 | 50 | 25 | 200 |
| 22 | 1 | 50 | 0 | 45 |

In the absence of ferrous iron, reduction was incomplete even after 200 minutes and that metal precipitated was substantially all deposited as foil on the reaction equipment. In contrast, reduction was substantially complete in Example 22, the metal being recovered as a fine powder suitable for use as seed powder.

EXAMPLE 23

A sample of solution as in Example 1 but having an $NH_3$Co mol ratio of 4:1 and containing 3 g./l. $Fe^{++}$ added as ferrous sulfate is treated with hydrogen for 15 minutes at 450° F. and 880 p. s. i. g. Substantially complete reduction is obtained, the product being in the form of a fine powder.

Although the presence of a reducing agent during hydrogen reduction with seed will form few if any new nuclei, nevertheless it may, in some cases, accelerate reduction and permit operation at lower pressures. This may be illustrated by the following examples.

EXAMPLES 24-29

Samples of a solution according to Examples 17-20 were treated under temperature and pressure conditions as therein in the presence of varying amounts of ferrous iron and nickel seed powder, the latter having been produced according to Example 20. Results are shown in Table V.

Table V

| Example | Fe++ (g./l.) | Ni Seed (g./l.) | Reduction Time (min.) |
| --- | --- | --- | --- |
| 24 | 1.0 | 40 | 30 |
| 25 | 1.0 | 80 | 15 |
| 26 | 1.0 | 300 | 4 |
| 27 | 0 | 40 | 45 |
| 28 | 0 | 80 | 25 |
| 29 | 0 | 300 | 6 |

EXAMPLES 30-31

Two samples of a solution containing 20 g./l. of nickel plus cobalt in a 5/4 ratio, 6 M/l. $NH_3$, and 4 M/l. $NH_4^+$ were reduced for twenty minutes at 400° F. with hydrogen and using 100 g./l. of seed nickel powder as produced in accordance with Example 23. In the first sample 1.0 g./l. of ferrous iron as a soluble ferrous salt was added while none was added to the second sample. Product was collected as a mixed metal. Results are shown in Table VI.

Table VI

| Example | Fe++ (g./l.) | Total Press. (p. s. i. g.) | Percent Yield | |
| --- | --- | --- | --- | --- |
| | | | Co | Ni |
| 30 | 0.0 | 800 | 50 | 93.9 |
| 31 | 1.0 | 700 | 85 | 96.4 |

We claim:

1. In recovering a metal selected from the group consisting of copper, nickel, and cobalt as discrete elemental metal powder from an aqueous solution containing at least one dissolved salt of at least one such metal by treating such solution with a reducing gas at a superatmospheric pressure and an elevated temperature, the improvement in combination therewith of rapidly inducing reduction to and formation of nuclei which comprises: initiating treatment in the presence of a finite amount of a nongaseous, nonmetallic nucleation promoter which under the treatment conditions is an active reducing agent whereby nuclei are formed.

2. A process according to claim 1 in which resultant nuclei are collected and used as seed in densification reduction of an aqueous solution of at least one salt of at least one such metal whereby metal precipitated during densification is deposited on the seed.

3. A process according to claim 1 in which nuclei are combined with additional solution adjusted for formation of nuclei and nucleation reduction continued until nuclei of at least 1.0 micron average particle diameter are obtained.

4. A process according to claim 1 in which at least 0.01 gram of nucleation promoter is present for each liter of solution to be treated.

5. A process according to claim 1 in which the reducing agent is selected from the group consisting of hypophosphites, hydrazines, and hydroquinone.

6. A process according to claim 1 in which the reducing agent is a cation selected from the group consisting of stannous, ferrous, manganous, and cerous.

7. A process according to claim 5 in which the reducing agent is added as a water-soluble hypophosphite salt.

8. A process according to claim 5 in which the reducing agent is added as a water-soluble salt of hydrazine.

9. In recovering a metal selected from the group consisting of nickel and cobalt as discrete elemental metal powder from an aqueous solution containing at least one dissolved salt of at least one such metal by treating such solution with a reducing gas at a superatmospheric pressure and an elevated temperature, the improvement in combination therewith of rapidly inducing reduction to and formation of nuclei which comprises: initiating treatment in the presence of a finite amount of iron in the form of a ferrous compoud, whereby nuclei are formed.

10. A process according to claim 9 in which the nuclei are used as seed in densification reduction.

References Cited in the file of this patent

UNITED STATES PATENTS

| | | |
|---|---|---|
| 1,164,141 | Sulzberger | Dec. 14, 1915 |
| 1,426,517 | Sulzberger | Aug. 22, 1922 |
| 1,686,391 | Muller et al. | Oct. 2, 1928 |
| 1,783,662 | Marx et al. | Dec. 2, 1930 |

OTHER REFERENCES

A Comprehensive Treatise On Inorganic and Theoretical Chemistry, by Mellor (1935), vol. 14, pages 70 and 316. Published by Longmans, Green & Co., New York.

The Canadian Mining and Metallurgical Bulletin for October 1953, Montreal, pages 645–648.